US012767749B2

(12) United States Patent
Ding et al.

(10) Patent No.: US 12,767,749 B2
(45) Date of Patent: Oct. 20, 2026

(54) POLYMER, THICKENING AGENT, AND PREPARATION METHOD THEREFOR

(71) Applicants: CHINA PETROLEUM & CHEMICAL CORPORATION, Beijing (CN); SINOPEC PETROLEUM ENGINEERING TECHNOLOGY RESEARCH INSTITUTE CO., LTD, Beijing (CN)

(72) Inventors: Shidong Ding, Beijing (CN); Fanghui Liu, Beijing (CN); Haitao Wang, Beijing (CN); Tingxue Jiang, Beijing (CN); Juanming Wei, Beijing (CN); Yiming Yao, Beijing (CN); Ziqi Shen, Beijing (CN); Jing Huang, Beijing (CN); Lishuang Wang, Beijing (CN)

(73) Assignees: CHINA PETROLEUM & CHEMICAL CORPORATION, Beijing (CN); SINOPEC PETROLEUM ENGINEERING TECHNOLOGY RESEARCH INSTITUTE CO., LTD., Beijing (CN)

( * ) Notice: Subject to any disclaimer, the term of this patent is extended or adjusted under 35 U.S.C. 154(b) by 434 days.

(21) Appl. No.: 18/580,210

(22) PCT Filed: Jul. 20, 2022

(86) PCT No.: PCT/CN2022/106824
§ 371 (c)(1),
(2) Date: Jan. 18, 2024

(87) PCT Pub. No.: WO2023/005769
PCT Pub. Date: Feb. 2, 2023

(65) Prior Publication Data

US 2024/0376242 A1 Nov. 14, 2024

(30) Foreign Application Priority Data

Jul. 30, 2021 (CN) ......................... 202110872132.3
Jul. 30, 2021 (CN) ......................... 202110872134.2
Jul. 30, 2021 (CN) ......................... 202110874712.6

(51) Int. Cl.
*C08F 234/00* (2006.01)
*C09K 8/68* (2006.01)

(52) U.S. Cl.
CPC .............. *C08F 234/00* (2013.01); *C09K 8/68* (2013.01)

(58) Field of Classification Search
None
See application file for complete search history.

(56) References Cited

U.S. PATENT DOCUMENTS 3,652,497 A 3/1972 Junas et al.
5,135,909 A * 8/1992 Stephens .................. C09K 8/24 507/121

(Continued)

FOREIGN PATENT DOCUMENTS

CN 103131404 A 6/2013
CN 104946227 A 9/2015

(Continued)

OTHER PUBLICATIONS

Liu; "Polymer microspheres with high drug-loading capacity via dual-modal drug loading for modulating controlled release property in pH/reduction dual responsive tumor-specific intracellular triggered doxorubicin release"; Colloids and Surfaces A; vol. 577, May 31, 2019, p. 291-295. (Year: 2019).*

(Continued)

*Primary Examiner* — Andrew Sue-Ako
(74) *Attorney, Agent, or Firm* — NKL Law; Allen Xue

(57) ABSTRACT

A polymer, a thickening agent, and a preparation method therefor are provided. The polymer contains structural units of formula (1), of formula (2), of formula (3), and of formula (4):

formula (1)

(Continued)

-continued formula (2)

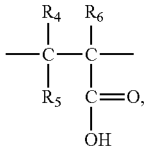

formula (3)

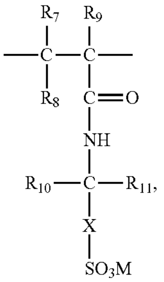

formula (4)

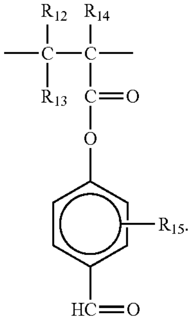

The thickening agent contains the polymer and has instant solubility. It can be used for thickening slickwater, a glue solution, a cross-linked fracturing fluid and an acid solution having different viscosities, which improves compatibility between different fracturing fluids. Various fracturing fluid systems prepared by using the thickening agent have good temperature resistance, shearing resistance, sand-carrying performance, and a slow speed.

20 Claims, 1 Drawing Sheet

(56) References Cited

U.S. PATENT DOCUMENTS

| | | | | |
|---|---|---|---|---|
| 2010/0247473 | A1 | 9/2010 | Blondel | |
| 2014/0342952 | A1 * | 11/2014 | Suryawanshi | C09K 8/12 507/226 |
| 2017/0051196 | A1 * | 2/2017 | Galindo | E21B 21/003 |

FOREIGN PATENT DOCUMENTS

| | | | |
|---|---|---|---|
| CN | 105860951 | A | 8/2016 |
| CN | 106146730 | A | 11/2016 |
| CN | 111171800 | A | 5/2020 |
| CN | 112521560 | A | 3/2021 |
| EA | 025616 | B1 | 1/2017 |
| EA | 026370 | B9 | 5/2017 |
| RU | 2726696 | C2 | 7/2020 |
| WO | 2010105050 | A1 | 9/2010 |
| WO | 2014055342 | A1 | 4/2014 |
| WO | 2015042026 | A1 | 3/2015 |

OTHER PUBLICATIONS

Ma, Xiping et al., "Synthesis and Performance Evaluation of Temperature-controlled Viscous Acid", Russian Journal of Applied Chemistry, vol. 92, No. 10, Dec. 31, 2019; ISSN: 1070-4272; pp. 1447-1457.

Khakpour, Hossein et al., "Rheological properties of acrylamide/butyl acrylate/2-acrylamido-2-methyl-1-propane sulfonic acid co- and terpolymers synthesized by heterogeneous and micellar methods", Polym. Bull., vol. 74, Apr. 4, 2017; ISSN: 0170-0839; pp. 5145-5161.

Xu, Mingjie et al.; "Domestic Progress of ultrahigh-temperature Fracturing Fluids in the Last Decade"; Oilfield Chemistry; vol. 35, No. 4; Dec. 25, 2018; pp. 721-725.

* cited by examiner

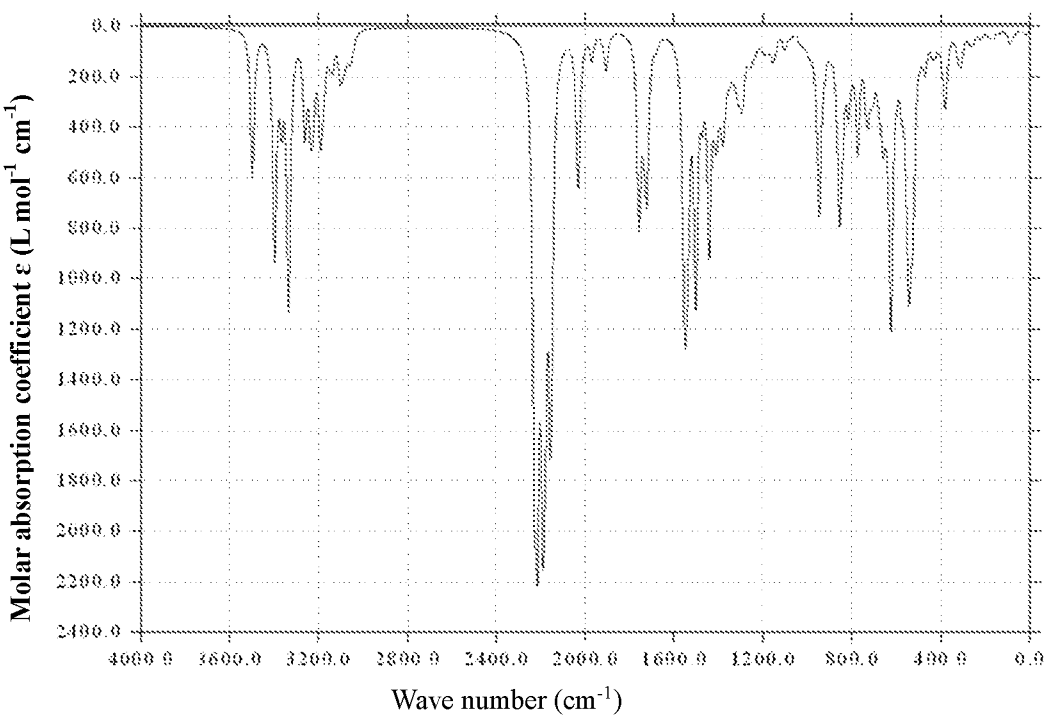
Molar absorption coefficient ε (L mol-1 cm-1)
Wave number (cm-1)
0.0
200.0
400.0
600.0
800.0
1000.0
1200.0
1400.0
1600.0
1800.0
2000.0
2200.0
2400.0
4000.0
3600.0
3200.0
2800.0
2400.0
2000.0
1600.0
1200.0
800.0
400.0
0.0

POLYMER, THICKENING AGENT, AND PREPARATION METHOD THEREFOR

CROSS REFERENCE TO RELATED APPLICATIONS

This application is a U.S. national stage entry of PCT International Application No. PCT/CN2022/106824, filed on Jul. 20, 2022, which claims the priority of the Chinese Patent Application No. "202110872134.2", filed on Jul. 30, 2021, entitled "A THICKENING AGENT AND PREPARATION METHOD AND USE THEREFOR", the Chinese Patent Application No. "202110872132.3", filed on Jul. 30, 2021, entitled "A FRACTURING LIQUID AND PREPARATION METHOD AND USE THEREFOR", and the Chinese Patent Application No. "202110874712.6", filed on Jul. 30, 2021, entitled "A CROSS-LINKING AGENT AND PREPARATION METHOD AND USE THEREFOR", the contents of which are specifically and entirely incorporated herein by reference in its entirety.

FIELD

The present disclosure relates to the technical field of oilfield chemistry, in particular to a polymer, a thickening agent and a preparation method therefor.

BACKGROUND

The deep stratum and ultra-deep stratum oil and gas resources are currently the key filed of domestic exploration and development in China. Over 70% of oil and gas wells require acid fracturing/acidification to build the production. However, the ultra-deep stratum oil and gas exploitation confronts with the problems such as deep burial, high temperature, high fracture pressure and large construction friction, thereby imposing serious challenges for the reservoir reformation technologies. The fracturing fluid systems currently used for the ultra-deep stratum reformation are mainly divided into three categories: bio-based fracturing fluids, mixed fracturing fluids consisting of natural polymer and synthetic polymer, and synthetic polymer fracturing fluids. The first two types of fracturing fluid systems have a maximum use temperature about 200° C., and the highest temperature of the synthetic polymer fracturing fluid systems is reported to be 240° C., thus the synthetic polymer fracturing fluid systems have larger application potential. However, all the three types of fracturing fluid systems suffer from the defects such as high viscosity of base fluid and large pumping frictional resistance, such that the on-site operation efficiency is severely affected (refer to "Domestic Progress of Ultrahigh-temperature Fracturing Fluids in the Last Decade", XU Mingjie, GUAN Baoshan, LIU Ping, YANG Yanli, WANG Haiyan, XU Ke, WANG Liwei, HUANG Gaochuan, *Journal of Oilfield chemistry,* 2018, 35 (04): 721-725). Therefore, the developed novel fracturing fluid systems should have the low frictional resistance and on-site blending performance.

The ultra-deep oil and gas reservoirs developed in China are mainly composed of the high temperature carbonate rocks, most of the oil and gas wells require acid fracturing modification to build the production, and require a use of the various fracturing fluids such as slickwater, glue solution, gelled acid or cross-linking acid to carry out the composite fracturing operations. For example, the drag-reduction agent used for slickwater is mostly a synthetic polymer, the thickening agent used for glue solution is primarily a modified guanidine glue, the gelled acid and the cross-linking acid require a use of the acid-resistant thickening agent, resulting in a wide variety of fluids for the on-site construction, requiring a large number of separately arranged liquid storage tanks, the preparation process is very cumbersome, and there are also problems such as poor compatibility among various fluids.

Therefore, it has important significance and promising application prospect to develop a thickening agent having a high temperature resistance, an integration and instant solubility, in order to achieve integration of thickening agents during the full fracturing or acid fracturing process, reduce the varieties of thickening agents, facilitate the on-site fluid preparation and construction, and solve the problem of poor compatibility between different liquids.

SUMMARY

In view of the existing problems in the prior art, the present disclosure aims to provide a novel polymer and thickening agent and preparation method therefor. The thickening agent comprising the polymer of the present disclosure has acid resistance and temperature resistance, enables the integration of the thickening agent during the full fracturing or acid fracturing process, and solves the problem of poor compatibility between different fracturing fluids, facilitates the on-site fluid preparation, thus the thickening agent can be used for reformation and increasing production of the deep stratum and ultra-deep stratum oil and gas reservoirs.

The thickening agent provided by the present disclosure not only can meet the requirement of high-temperature reservoir fracturing, but also can efficiently streamline the on-site fluid preparation and construction, thus the thickening agent has a very wide application prospect and may yield the considerable economic benefit.

In order to achieve the above objectives, a first aspect of the present disclosure provides a polymer comprising a structural unit as shown in formula (1), a structural unit as shown in formula (2), a structural unit as shown in formula (3), and a structural unit as shown in formula (4), formula (1)

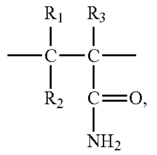

formula (2)

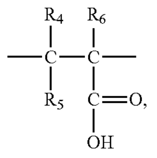

formula (3)

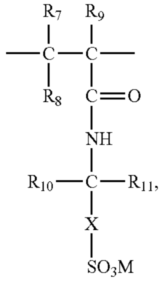

-continued formula (4)

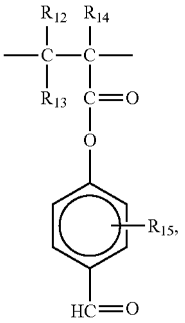

wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ are each independently hydrogen or a straight or branched C1-C10 alkyl group;

X is a straight or branched C1-C10 alkylene group;

M is hydrogen or an alkali metal.

A second aspect of the present disclosure provides a thickening agent comprising the aforementioned polymer.

A third aspect of the present disclosure provides a method of preparing a thickening agent comprising: subjecting the polymeric monomers in an organic solvent and a co-agent to a polymerization reaction in the presence of an initiator under the polymerization reaction conditions, wherein the polymeric monomers include a monomer as shown in formula (I), a monomer as shown in formula (II), a monomer as shown in formula (III), and a monomer as shown in formula (IV), formula (I)

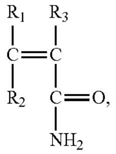

formula (II)

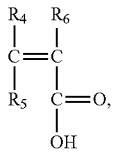

formula (III)

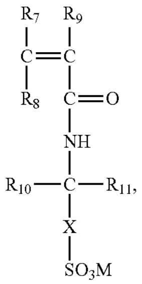

-continued formula (IV)

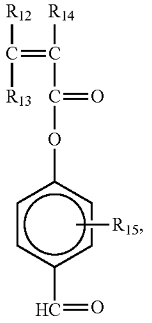

wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ are each independently hydrogen or a straight or branched C1-C10 alkyl group;

X is a straight or branched C1-C10 alkylene group;

M is hydrogen or an alkali metal.

Due to the above technical schemes, the polymer and thickening agent and preparation method therefor provided by the present disclosure produce the favorable effects as follows:

1) The polymer provided by the present disclosure is a polymer with a novel structure, the polymer comprises four structural units as shown in formula (1), formula (2), formula (3) and formula (4), so as to fully exert their respective performance characteristics and can produce good synergistic effects, thereby ensuring that the polymer has good temperature resistance and strong crosslinking ability of the polymer. Because of the specific molecular structure of said polymer, there are favorable effects of sand suspension, drag reduction and speed retardation under the condition of ultra-high temperature.

2) The thickening agent comprising the polymer provided by the present disclosure can be used for thickening different viscosity of slickwater, a glue solution, a cross-linked fracturing fluid and an acid solution having different viscocities, such that the integration of the thickening agent in various fracturing fluids is achieved, the used amount of on-site devices is reduced, and the problem of poor compatibility between different fluids is solved, the thickening agent can meet the requirements of reforming the ultra-high temperature reservoir, and has a widespread application prospect.

The method of preparing the thickening agent provided by the present disclosure is simple and easy to operate, can be easily controlled, so as to facilitate the on-site fluid preparation and construction, enables the on-site blending, the product type (powder or liquid) can be customized according to the on-site needs, avoids the problem of poor compatibility between different liquids, thus the thickening agent is applicable to large-scale reformation and construction, and solves the problems of high viscosity of the base liquid and the difficulty in pumping operation.

BRIEF DESCRIPTION OF THE DRAWINGS

The FIGURE illustrates an infrared spectrogram of the thickening agent obtained in Example 1 of the present disclosure.

FIG. 1 illustrates an infrared spectrogram of the thickening agent obtained in Example 1 of the present disclosure.

DESCRIPTION OF THE PREFERRED EMBODIMENT

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

A first aspect of the present disclosure provides a polymer comprising a structural unit as shown in formula (1), a structural unit as shown in formula (2), a structural unit as shown in formula (3) and a structural unit as shown in formula (4), formula (1)

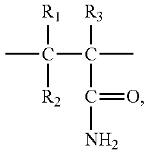

formula (2)

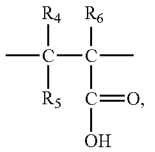

formula (3)

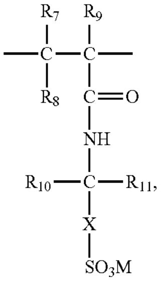

formula (4)

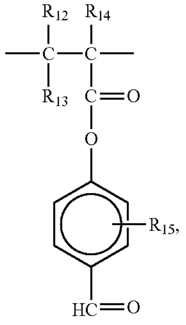

wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ are each independently hydrogen or a straight or branched C1-C10 alkyl group;

X is a straight or branched C1-C10 alkylene group;

M is hydrogen or an alkali metal.

In the present disclosure, the examples of a straight or branched C1-C10 alkyl group may be, for instance, any one of methyl, ethyl, n-propyl, isopropyl, n-butyl, sec-butyl, isobutyl, t-butyl, n-pentyl, isopentyl, t-pentyl, neopentyl, n-hexyl, isohexyl, n-heptyl, isoheptyl, 2-methylhexyl, 2-ethylhexyl, 1-methylheptyl, 2-methylheptyl, n-octyl, iso-octyl, n-nonyl, isononyl and 3,5,5-trimethylhexyl.

In the present disclosure, the straight or branched C1-C10 alkylene group may be exemplified by any one of methylene, 1,2-ethylidene, n-propylidene, isopropylidene, n-butylidene, isobutylidene, n-pentylidene, isopentylidene, n-hexylidene, isohexylidene, n-heptylidene, isoheptylidene, 2-methylhexylidene, 2-ethylhexylidene, 1-methylheptylidene, 2-methylheptylidene, n-octylidene, isooctylidene and n-nonylidene.

In the present disclosure, $R_{15}$ can be disposed at various positions on the phenyl ring represented by formula (4), i.e., it can be located at the ortho-position or meta-position to the aldehyde group.

In the present disclosure, examples of the alkali metal may be any one of Li, Na and K.

In some embodiments, $R_1$, $R_2$ and $R_3$ in formula (1) are each independently hydrogen or a straight or branched C1-C6 alkyl group, more preferably hydrogen or a straight or branched C1-C4 alkyl group; further preferably hydrogen, methyl or ethyl.

In a particularly preferred embodiment of the present disclosure, $R_1$, $R_2$ and $R_3$ in formula (1) are each independently hydrogen. In this case, the structural unit as shown in formula (1) may be a structural unit from acrylamide.

In some embodiments, $R_4$, $R_5$ and $R_6$ in formula (2) are each independently hydrogen or a straight or branched C1-C6 alkyl group; more preferably hydrogen or a straight or branched C1-C4 alkyl group; further preferably hydrogen, methyl or ethyl.

In a particularly preferred embodiment of the present disclosure, $R_4$, $R_5$ and $R_6$ in formula (2) are each independently hydrogen. In this case, the structural unit as shown in formula (2) may be a structural unit from acrylic acid.

In some embodiments, $R_7$, $R_8$, $R_9$, $R_{10}$ and $R_{11}$ in formula (3) are each independently hydrogen or a straight or branched C1-C6 alkyl group; more preferably hydrogen or a straight or branched C1-C4 alkyl group; further preferably hydrogen, methyl or ethyl.

In addition, X in formula (3) is a straight or branched C1-C6 alkylene group, more preferably a straight or branched C1-C3 alkylene group, further preferably methylene or 1,2-ethylidene.

Moreover, M in formula (3) is hydrogen or sodium, more preferably hydrogen.

In a particularly preferred embodiment of the present disclosure, $R_7$, $R_5$ and $R_9$ in formula (3) are each independently hydrogen, $R_{10}$ and $R_{11}$ are each independently methyl group, X is methylene, M is hydrogen. In this case, the structural unit as shown in formula (3) may be a structural unit derived from acrylic acid-2-acrylamido-2-methylpropane sulfonic acid (AMPS).

In some embodiments, $R_{12}$, $R_{13}$, $R_{14}$ and $R_{15}$ in formula (4) are each independently hydrogen or a straight or branched C1-C6 alkyl group, preferably hydrogen or a straight or branched C1-C4 alkyl group; more preferably hydrogen, methyl or ethyl.

In a particularly preferred embodiment of the present disclosure, each of $R_{12}$, $R_{13}$, $R_{14}$ and $R_{15}$ in formula (4) is hydrogen, and in this case, the structural unit as shown in formula (4) may be a structural unit from p-acryloyloxybenzaldehyde.

The polymer of the present disclosure comprises four structural units as shown in formula (1), formula (2), formula (3) and formula (4), so as to fully exert their performance characteristics and can produce good synergistic effects, thereby ensuring that the polymer has good temperature resistance and strong crosslinking capability. The polymer thickening agent obtained after introducing the structural unit as shown in formula (4) is capable of crosslinking with the organozirconium-based crosslinking agent, and satisfying the preparation of crosslinked fracturing fluids and crosslinked acids. The possible reasons are that the structural unit as shown in formula (4) can provide crosslinking groups having the dual crosslinking effects in terms of physical and chemical fields, thereby increasing the number of crosslinking sites, providing the cross-linked gel with an excellent temperature resistance and shear resistance, as well as the sand-carrying performance and retarding performance. The cross-linked fracturing fluid gel enables the cross-linked fracturing fluid to exhibit desirable temperature resistance and shear resistance, while the cross-linked gel acid can improve the temperature resistance and retarding properties of the acid solution, such that an integration of the thickening agent for fracturing fluid-acid solution is achieved.

In some embodiments, a molar ratio of the structural unit as shown in formula (1), the structural unit as shown in formula (2), the structural unit as shown in formula (3) and the structural unit as shown in formula (4) is within a range of 65-74:1-10:19-21:0.5-1. By limiting the molar ratio of the four structural units within the aforementioned range, the temperature resistance and cross-linking performance of the polymer can be further improved.

Unless otherwise specified in the present disclosure, the molar ratio of structural units is calculated based on the feeding amounts.

In some embodiments, besides the structural unit as shown in formula (1), the structural unit as shown in formula (2), the structural unit as shown in formula (3) and the structural unit as shown in formula (4) mentioned above, the polymer further comprises a structural unit as shown in formula (5), formula (5)

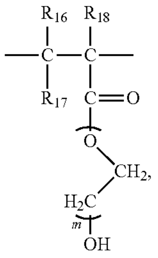

Wherein $R_{16}$, $R_{17}$ and $R_{18}$ are each independently hydrogen or a straight or branched C1-C6 alkyl group; m denotes the number of oxyethylene structure, m=6-10.

In some preferred embodiments, $R_{16}$, $R_{17}$ and $R_{18}$ are each independently hydrogen or a straight or branched C1-C4 alkyl group; preferably hydrogen, methyl or ethyl; more preferably hydrogen.

In some preferred embodiments, a molar ratio of the structural unit as shown in formula (1) to the structural unit as shown in formula (5) is within a range of 65-74:2-4.

In a particularly preferred embodiment of the present disclosure, $R_{16}$, $R_{17}$ and $R_{18}$ in formula (5) are each independently hydrogen. In this case, the structural unit as shown in formula (5) may be a structural unit derived from polyoxyethylene acrylate.

In the present disclosure, the solubility of polymer can be improved by introducing the structural unit as shown in formula (5) into the polymer. The polymer has better solubility when m (i.e., the number of oxyethylene structure) is within a range of 6-10.

In some embodiments, besides the structural unit as shown in formula (1), the structural unit as shown in formula (2), the structural unit as shown in formula (3), the structural unit as shown in formula (4), and optionally the structural unit as shown in formula (5) mentioned above, the polymer further comprises a structural unit as shown in formula (6), formula (6)

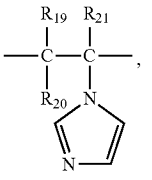

wherein $R_{19}$, $R_{20}$ and $R_{21}$ are each independently hydrogen or a straight or branched C1-C6 alkyl group.

In some preferred embodiments, $R_{19}$, $R_{20}$ and $R_{21}$ are each independently hydrogen or a straight or branched C1-C4 alkyl group; preferably hydrogen, methyl or ethyl; more preferably hydrogen.

In a particularly preferred embodiment of the present disclosure, each of $R_{19}$, $R_{20}$ and $R_{21}$ in formula (6) is hydrogen, in this case, the structural unit as shown in formula (6) may be a structural unit derived from vinylimidazole.

In the present disclosure, the introduction of the structural unit as shown in formula (6) into the polymer will significantly influence the alkali resistance of the polymer and improve the viscoelasticity of the polymer.

In some preferred embodiments, a molar ratio of the structural unit as shown in formula (1) to the structural unit as shown in formula (6) is within a range of 65-74:0.5-1.

In the present disclosure, a molar ratio of the structural unit as shown in formula (1), the structural unit as shown in formula (2), the structural unit as shown in formula (3), the structural unit as shown in formula (4), the structural unit as shown in formula (5) and the structural unit as shown in formula (6) is within a range of 65-74:1-10:19-21:0.5-1:2-4:0.5-1, such as 74:1:21:0.5:3:0.5, 74:1:19:0.5:2:0.5, 72:8:21:0.9:3:0.8, 65:10:19:1:4:1, 65:9:20:1:4:1, 67:8:20.5:1:3:0.5, 68:7:19.5:1:4:0.5, 70:6:21:0.5:3.5:1, 70:5:20:1:3:1, and any value within a range formed by any two ratios.

In the present disclosure, the polymer is a random copolymer, and the structural units are randomly distributed on the main chain.

In some embodiments, the polymer has a viscosity average molecular weight of 12,000,000-14,000,000.

In the present disclosure, the viscosity average molecular weight of the polymer is measured by the Ubbelohde viscometer method.

In a particularly preferred embodiment of the present disclosure, the polymer has a structure as shown in the formula below:

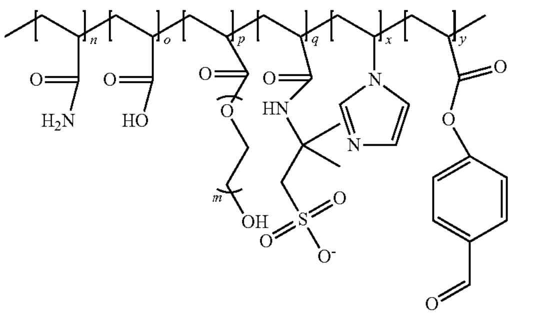

wherein n, o, p, q, x, and y denote the mole percentages of the respective structural unit, wherein n+o=75%, n=65%-74%; o=1%-10%; p+q+x+y=25%, q=19%-21%; p=2%-4%; x=0.5%-1%; y=0.5%-1%; m denotes the number of oxyethylene structure, m=6-10.

In the present disclosure, even the polymer is prepared under the same preparation conditions, its structural units are randomly distributed, the polymer comprises one or more forms of structural formula.

According to the present disclosure, the polymer of the present disclosure is a random copolymer. The aforementioned formula is only a schematic formula of one of the structures of these six structural units after polymerization. The structural units formed by the six monomers are randomly distributed on the main chain.

The polymer provided by the embodiments of the present disclosure is a polymer with a novel structure, the polymer comprises six structure units as shown in formula (1), formula (2), formula (3), formula (4), formula (5) and formula (6) respectively, so as to exert their performance characteristics and can produce the good synergistic effects, such that the polymer has desirable temperature resistance, shear resistance, instant solubility and viscoelasticity, which can improve the elasticity, shear restoration performance, temperature resistance, drag reduction capability and sand-carrying performance of the fracturing fluids, may achieve excellent effect of suspending sands under the ultra-high temperature, thus the polymer is suitable for fracturing operations in regard to the reservoirs with a temperature of 200° C. or above.

Furthermore, the method of preparing the polymer according to the first aspect of the present disclosure is not particularly limited, for example, the polymer may be prepared by subjecting the monomers corresponding to the structural units to a polymerization reaction in a solvent under the polymerization reaction conditions in the presence of an initiator, preferably, the polymerization reaction conditions comprise a temperature within the range of 50° C.-90° C., preferably 60° C.-80° C.; a time within the range of 3-6 h, preferably 4-5 h; and a pH within the range of 5-11, preferably 6-10. The initiator may be an azo-type initiator, for example, at least one selected from the group consisting of azobisisobutyramidine hydrochloride and azobisisobutyrimidazoline hydrochloride. The specific method may be carried out as described in the method of preparing the thickening agent of the third aspect below, the content will not be described in detail herein.

A second aspect of the present disclosure provides a thickening agent comprising the polymer as described above.

In some embodiments, the liquid thickening agent with a concentration of 30 wt % is added into the fresh water to form a slickwater having a polymer concentration of 0.09 wt %, the dissolution time of said thickening agent in the fresh water is less than 1 min.

In some embodiments, the liquid thickening agent with a concentration of 30 wt % is added into the fresh water to form a slickwater having a polymer concentration of 0.09 wt %, the apparent viscosity of the slickwater larger than or equal to 10 mPa·s.

In some embodiments, the liquid thickening agent with a concentration of 30 wt % is added into the fresh water to form a slickwater having a polymer concentration of 0.09 wt %, the drag-reduction ratio of the slickwater is greater than or equal to 60%.

In the present disclosure, the liquid thickening agent is obtained by dispersing a powder of the dry powdered thickening agent in a mineral oil containing a mineral dispersant. The mineral oil is at least one selected from the group consisting of 5 # white oil, diesel oil and light crude oil. As for the specific preparation steps of the dry powdered thickening agent and the liquid thickening agent, please refer to the method for preparing the thickening agent described hereinafter.

The thickening agent of the present disclosure comprises the abovementioned polymer, it allows for production of the integrated fracturing liquid which can be used for on-site instant dissolving and blending, exhibits high temperature resistance and acid resistance, and can be crosslinked over a broad spectrum of pH ranges, the thickening agent not only can meet the fracturing requirement of high temperature reservoirs, but also efficiently streamline the on-site fluid preparation and construction procedures, thus it has a very wide application prospect and may yield the considerable economic benefit.

A third aspect of the present disclosure provides a method of preparing a thickening agent comprising:

subjecting polymeric monomers in an organic solvent and a co-agent to a polymerization reaction in the presence of an initiator under the polymerization reaction conditions, wherein the polymeric monomers include a monomer as shown in formula (I), a monomer as shown in formula (II), a monomer as shown in formula (III), and a monomer as shown in formula (IV), formula (I)

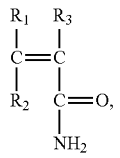

formula (II)

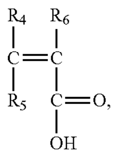

-continued formula (III)

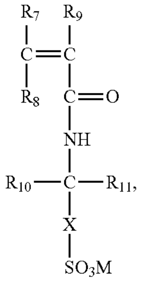

formula (IV)

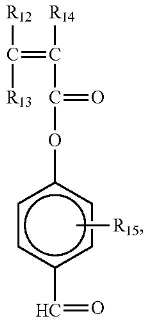

wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ are each independently hydrogen or a straight or branched C1-C10 alkyl group;

X is a straight or branched C1-C10 alkylene group;

M is hydrogen or an alkali metal.

In the present disclosure, $R_{15}$ can be disposed at various positions on the phenyl ring represented by formula (IV), i.e., it can be located at the ortho-position or meta-position to the aldehyde group.

Examples of a straight or branched C1-C10 alkyl group, examples of a straight or branched C1-C10 alkylene group, and examples of alkali metal according to a third aspect of the present disclosure are as set forth above for the first aspect of the present disclosure, the content will not be repeated herein.

According to the present disclosure, $R_1$, $R_2$ and $R_3$ in formula (I) are preferably the same as the corresponding $R_1$, $R_2$ and $R_3$ in formula (1) of the first aspect of the present disclosure, and in a particularly preferred embodiment of the present disclosure, each of $R_1$, $R_2$ and $R_3$ in formula (I) is hydrogen, i.e., the monomer as shown in formula (I) is acrylamide.

According to the present disclosure, $R_4$, $R_5$ and $R_6$ in formula (II) are preferably the same as the corresponding $R_4$, $R_5$ and $R_6$ in formula (2) of the first aspect of the present disclosure, and in a particularly preferred embodiment of the present disclosure, each of $R_4$, $R_5$ and $R_6$ in formula (II) is hydrogen, i.e., the monomer as shown in formula (II) is acrylic acid.

According to the present disclosure, $R_7$, $R_8$, $R_9$, $R_{10}$, $R_{11}$, X and M in formula (III) are preferably the same as the corresponding $R_7$, $R_8$, $R_9$, $R_{10}$, $R_{11}$, X and M in formula (3) of the first aspect of the present disclosure, and in a particularly preferred embodiment thereof, each of $R_7$, $R_8$ and $R_9$ in formula (III) is hydrogen, both $R_{10}$ and $R_{11}$ are methyl, X is methylene, and M is hydrogen. That is, monomer as shown in formula (III) is acrylic acid-2-acrylamido-2-methylpropanesulfonic acid.

According to the present disclosure, $R_{12}$, $R_{13}$, $R_{14}$ and $R_{15}$ in formula (IV) are preferably the same as the corresponding $R_{12}$, $R_{13}$, $R_{14}$ and $R_{15}$ in formula (4) of the first aspect of the present disclosure, and in a particularly preferred embodiment of the present disclosure, each of $R_{12}$, $R_{13}$, $R_{14}$ and $R_{15}$ in formula (IV) is hydrogen, i.e., the monomer as shown in formula (IV) is p-acryloyloxybenzaldehyde.

In some preferred embodiments, the p-acryloyloxybenzaldehyde may be obtained by subjecting the p-hydroxybenzaldehyde to the condensation reaction with an acryloyl halide (e.g., acryloyl chloride).

In some embodiments, a molar ratio of the monomer as shown in formula (I), the monomer as shown in formula (II), the monomer as shown in formula (III) and the monomer as shown in formula (IV) is within a range of 65-74:1-10:19-21:0.5-1. By limiting the molar ratio of the four monomers within the aforementioned range, the temperature resistance and cross-linking performance of the polymer can be further improved.

In some embodiments, in addition to a monomer as shown in formula (I), a monomer as shown in formula (II), a monomer as shown in formula (III), and a monomer as shown in formula (IV), the polymeric monomer further comprises a monomer as shown in formula (V) and/or a monomer as shown in formula (VI), formula (V)

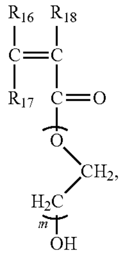

formula (VI)

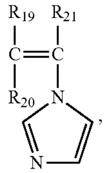

wherein $R_{16}$, $R_{17}$ and $R_{18}$ are each independently hydrogen or a straight or branched C1-C6 alkyl group; m denotes the number of oxyethylene structure, m=6-10; $R_{19}$, $R_{20}$ and $R_{21}$ are each independently hydrogen or a straight or branched C1-C6 alkyl group.

According to the present disclosure, $R_{16}$, $R_{17}$ and $R_{18}$ in formula (V) are preferably the same as the corresponding $R_{16}$, $R_{17}$ and $R_{18}$ in formula (5) according to the first aspect of the present disclosure, and in a particularly preferred embodiment of the present disclosure, $R_{16}$, $R_{17}$ and $R_{18}$ in formula (V) are each independently hydrogen, i.e., the monomer as shown in formula (V) is polyoxyethylene acrylate.

In the present disclosure, the solubility of the polymer can be improved by introducing the monomer as shown in formula (V) into the polymer. The structural unit as shown in formula (V) is introduced by an polyoxyethylene acrylate type polymerizable surfactant, preferably, the polyoxyethylene acrylate type polymerizable surfactant (MOEA) has the CAS #9051-31-4, a polymerization degree m=6-10, and a molecular weight of 336.38-424.48. The polymer has better solubility when m (i.e., the number of oxyethylene structures) is within a range of 6-10.

According to the present disclosure, $R_{19}$, $R_{20}$ and $R_{21}$ in formula (VI) are preferably the same as the corresponding $R_{19}$, $R_{20}$ and $R_{21}$ in formula (6) of the first aspect of the present disclosure, and in a particularly preferred embodiment of the present disclosure, $R_{19}$, $R_{20}$ and $R_{21}$ in formula (VI) are each independently hydrogen, and in the case, the monomer as shown in formula (VI) is vinylimidazole.

In the present disclosure, introduction of the monomer as shown in formula (VI) into the polymer will greatly influence the alkali resistance of the polymer, and improve viscoelasticity of the polymer.

In the present disclosure, a molar ratio of the monomer as shown in formula (I), the monomer as shown in formula (II), the monomer as shown in formula (III), the monomer as shown in formula (IV), the monomer as shown in formula (V) and the monomer as shown in formula (VI) is within a range of 65-74:1-10:19-21:0.5-1:2-4:0.5-1, such as 74:1:21:0.5:3:0.5, 74:1:19:0.5:2:0.5, 72:8:21:0.9:3:0.8, 65:10:19:1:4:1, 65:9:20:1:4:1, 67:8:20.5:1:3:0.5, 68:7:19.5:1:4:0.5, 70:6:21:0.5:3.5:1, 70:5:20:1:3:1, and any value within a range formed by any two ratios.

In a particularly preferred embodiment of the present disclosure, the method of preparing the thickening agent specifically comprises the following steps:

S1: mixing the polymeric monomers, deionized water and an organic solvent to obtain a first solution;

S2: blending the first solution with a chain transfer agent, a complexing agent, a co-solvent and an activator to obtain a second solution;

S3: adjusting pH of the second solution to be within a range of 6-10 to obtain a third solution;

S4: mixing and polymerizing the third solution with a water-soluble azo-type initiator, a reducing agent and an oxidizing agent to prepare a polymeric jelly.

In some embodiments, the polymeric monomers in step S1 comprises a monomer as shown in formula (I), a monomer as shown in formula (II), a monomer as shown in formula (III), and a monomer as shown in formula (IV); and in some preferred embodiments, the polymeric monomers further comprises a monomer as shown in formula (V) and/or a monomer as shown in formula (VI).

In some embodiments, a weight ratio of the polymeric monomers to the organic solvent is within a range of 25-29:10-15. In some preferred embodiments, the total weight of the polymeric monomers is 25-29 wt %, for example, 26 wt %, 27 wt %, 28 wt %, and any value within a range formed by any two numerical values, relative to the total weight of the first solution. The weight of the organic solvent is 10-15 wt %, for example, 11 wt %, 12 wt %, 13 wt %, 14 wt %, and any value within a range formed by any two numerical values, relative to the total weight of the first solution.

In some preferred embodiments, the organic solvent is at least one selected from the group consisting of N,N'-dimethylformamide, dimethylsulfoxide, methanol and ethanol.

In some embodiments, the chain transfer agent in step S2 is at least one selected from the group consisting of sodium formate, potassium formate and isopropanol.

In some preferred embodiments, the chain transfer agent is added in an amount of 0.03-0.15 wt %, based on the total weight 100 wt % of the polymeric monomers.

In some embodiments, the complexing agent in step S2 is at least one selected from the group consisting of ethylene diamine tetraacetic acid disalt, ethylene diamine tetraacetic acid tetrasalt and triethylene tetramine pentaacetate; further preferably at least one selected from the group consisting of diamine tetraacetic acid disodium salt, ethylene diamine tetraacetic acid tetrasodium salt and triethylene tetramine pentaacetate pentasodium salt.

In some preferred embodiments, the complexing agent is added in an amount of 0.02-0.1 wt %, based on the total weight 100 wt % of the polymeric monomers.

In some embodiments, the co-solvent in step S2 is at least one selected from the group consisting of urea, thiourea and ammonium chloride.

In some preferred embodiments, the co-solvent is added in an amount of 0.5-5 wt %, based on the total weight 100 wt % of the polymeric monomers.

In some embodiments, the activator in step S2 is at least one selected from the group consisting of N,N,N',N'-tetramethylethylenediamine, ethylenediamine and triethanolamine.

In some preferred embodiments, the activator is added in an amount of 0.04-0.12 wt %, based on the total weight 100 wt % of the polymeric monomers.

In some embodiments, the oxidizing agent in step S4 is at least one selected from the group consisting of ammonium persulfate, potassium persulfate and hydrogen peroxide.

In some preferred embodiments, the oxidant is added in an amount of 0.01-0.15 wt %, based on the total weight 100 wt % of the polymeric monomers.

In some embodiments, the reducing agent in step S4 is at least one selected from the group consisting of sodium bisulfite, sodium sulfite and ammonium ferrous sulfate.

In some preferred embodiments, the reducing agent is added in an amount of 0.005-0.05 wt %, based on the total weight 100 wt % of the polymeric monomers.

In the present disclosure, the initiator may be various initiators which are commonly used in the art and capable of initiating polymerization reaction of the monomers, for example, the initiator may be an azo-type initiator.

In some preferred embodiments, the water-soluble azo-type initiator in step S4 is at least one selected from the group consisting of azobisisobutyramidine hydrochloride and azobisisobutyrimidazoline hydrochloride; preferably at least one of a sodium salt or a potassium salt; more preferably, the water-soluble azo-type initiator is at least one selected from the group consisting of azobisisobutyramidine hydrochloride sodium salt and azobisisobutyrimidazoline hydrochloride sodium salt.

In some preferred embodiments, the water-soluble azo-based initiator is added in an amount of 0.01-0.08 wt %, based on the total weight 100 wt % of the polymeric monomers.

In some embodiments, the third solution in step S3 is placed in a nitrogen gas atmosphere.

In some embodiments, the polymerization reaction conditions in step S4 comprise a temperature within the range of 50° C.-90° C., preferably 60° C.-80° C.; a time within the range of 3-6 h, preferably 4-5 h; and a pH within the range of 5-11, preferably 6-10.

In the present disclosure, the polymerization reaction is an exothermic reaction, and the temperature of the system is controlled by a water bath. Therefore, the temperature change of the system should be observed closely after the polymerization reaction is started, when the temperature of the system is raised to 60° C.-80° C., the heat preservation is initiated and maintained for 4-5 hours.

In some embodiments, the water-soluble azo-type initiator, the reducing agent and the oxidizing agent in step S4 are separately formulated into an aqueous solution before mixing with the third solution, the concentration of the formulated solutions is not particularly required, it is adjustable according to the practical requirements and the use scale.

In some preferred embodiments, the second solution is cooled to a temperature within the range of 5° C.-10° C. after step S2 and before step S3. For example, the second solution is placed in a water bath with a temperature of 5° C.-10° C. and cooled for 30 minutes. Depending on the kind of monomers, the polymerization of some monomer will be exothermic and the polymerization of some monomer does not release heat during the mixing process, thus the second solution is cooled in order to facilitate the subsequent low-temperature polymerization.

In some preferred embodiments, the third solution is cooled to a temperature within the range of 5° C.-10° C. after step S3 and before step S4. For example, the third solution is placed in a water bath with a temperature of 5° C.-10° C. and cooled for 30 minutes. An exothermic phenomenon may occur during adjustment of the pH, thus the third solution is cooled to facilitate the subsequent low-temperature polymerization.

In some embodiments, the method further comprises S5: granulating, drying, pulverizing and sieving the polymerized colloid obtained from step S4 to prepare dry powdered thickening agent.

In some preferred embodiments, the conditions of drying in step S5 comprise a temperature within the range 60° C.-80° C.; the dried product has a moisture content below 10 wt %, more preferably below 5 wt %, further preferably below 3 wt %.

In some preferred embodiments, the granulating in step S5 has a size of 0.2-0.7 cm, preferably 0.3-0.5 cm.

In some preferred embodiments, the conditions of drying in step S5 comprise a temperature within the range 60° C.-80° C.; the dried product has a moisture content below 10 wt %, preferably below 5 wt %, more preferably below 3 wt %.

In some preferred embodiments, the mesh number of screening in step S5 is within a range of 20-70 mesh, more preferably 20-40 mesh.

In some preferred embodiments, a powder of the dry powdered thickening agent in step S5 has a particle size less than 400 mesh.

In some embodiments, the method further comprises S6: dispersing a powder of the dry powdered thickening agent obtained in step S5 in a mineral oil containing a mineral dispersant in order to obtain a liquid thickening agent.

In some preferred embodiments, the liquid thickening agent in step S6 has a concentration within a range of 20-40 wt %.

In some preferred embodiments, the mineral oil in step S6 is at least one selected from the group consisting of 5 # white oil, diesel oil and light crude oil.

In some preferred embodiments, the mineral dispersant in step S6 is at least one selected from the group consisting of OP-10 (alkylphenol polyoxyethylene (10) ether), Span 40 and Tween 80.

The method of a thickening agent provided by the present disclosure is simple, it can be conveniently operated and easily controlled, and the product type (powder or liquid) can be tailored according to the on-site requirements. The yield of thickening agent in the present disclosure can reach 95%-99%.

Due to the special molecular structure of the thickening agent having the high temperature resistance and integration, the thickening agent not only has desirable acid resistance, temperature resistance, shear resistance, but also exhibits instant solubility, and achieves the on-site blending; in addition, the different fracturing liquid systems can be formed by adjusting the use concentration and solvent type of the thickening agent, thereby achieving the integrated configuration of the high temperature resistant fracturing fluid and the acid solution, thus the thickening agent is applicable to large-scale reformation and construction, and solves the problems of high viscosity of the base liquid and the difficulty in pumping operation.

The present disclosure also provides a method of using the aforementioned thickening agent or the thickening agent prepared with the aforesaid method in the reformation of reservoir, preferably in the reformation of oil and gas reservoir.

In some embodiments, the reservoir conditions of the oil and gas reservoir comprise: a depth of 5,000-12,000 km, a temperature of 150° C.-250° C.

In some embodiments, the method includes, but not limited to, the slickwater, glue solution, cross-linked fracturing fluid, gelled acid or cross-linked acid systems having different viscosities prepared with the thickening agent.

The thickening agent of the present disclosure can be used for thickening slickwater, glue solution, cross-linked fracturing fluid and acid solution having different viscosities, achieves integration of the thickening agent, reduces the number of field equipment, solves the problem of poor compatibility between different fracturing fluids, it can meet the requirements of reforming the ultra-high temperature reservoir, and has a widespread market application prospect.

The present disclosure provides a slickwater comprising the aforementioned thickness agent.

In addition to the thickening agent, the slickwater typically comprises water, a cleanup additive and a clay stabilizer; the typical contents are 0.05-1.2 wt % of the thickening agent, 0.1-0.3 wt % of the cleanup additive, and 0.1-0.3 wt % of the clay stabilizer respectively.

Further, the slickwater is at least one selected from the group consisting of: low viscosity slickwater, medium viscosity slickwater, high viscosity slickwater, and ultra-high viscosity slickwater.

As generally known among those skilled in the art, the low viscosity slickwater has a viscosity of 1-3 mPa's at 25° C., the medium viscosity slickwater has a viscosity of 3-18 mPa's (excluding 3 mPa·s) at 25° C., the high viscosity slickwater has a viscosity of 18-35 mPa·s (excluding 18 mPa·s) at 25° C., and the ultra-high viscosity slickwater has a viscosity of 35-45 mPa's (excluding 35 mPa s) at 25° C.

In some embodiments, the slickwater is low viscosity slickwater comprising 0.05-0.1 wt % of the thickness agent, based on the total weight of the low viscosity slickwater.

In some embodiments, the slickwater is medium viscosity slickwater comprising 0.1-0.15 wt % (excluding 0.1 wt %) of the thickness agent, based on the total weight of the medium viscosity slickwater.

In some embodiments, the slickwater is high viscosity slickwater comprising 0.15-0.25 wt % (excluding 0.15 wt %) of the thickness agent, based on the total weight of the high viscosity slickwater.

In some embodiments, the slickwater is ultra-high viscosity slickwater comprising 0.25-0.3 wt % (excluding 0.25 wt %) of the thickness agent, based on the total weight of the ultra-high viscosity slickwater.

The present disclosure provides a glue solution comprising the thickening agent described above.

Further, the thickening agent is contained in an amount of 0.3-0.8 wt %, based on the total weight of the glue solution.

In addition to the thickening agent, the slickwater typically comprises water, a cleanup additive and a clay stabilizer; the typical contents are 0.1-0.3 wt % of the cleanup additive and 0.1-0.3 wt % of the clay stabilizer respectively.

The present disclosure provides a cross-linked fracturing fluid comprising the above-mentioned thickening agent.

In some embodiments, the raw materials for preparing the cross-linked fracturing fluid comprise: a thickening agent, a cleanup additive, a clay stabilizer, a gel breaker, a cross-linking agent and water.

Further, the raw materials for preparing the cross-linked fracturing fluid comprise the following ingredients calculated in parts by weight:

the thickening agent in an amount of 0.4-1.2 parts by weight, preferably 0.4-0.6 parts by weight;

the cleanup additive in an amount of 0.5-1.5 parts by weight, preferably 0.6-1.2 parts by weight;

the clay stabilizer in an amount of 0.5-1.5 parts by weight, preferably 0.6-1.2 parts by weight;

the gel breaker in an amount of 0.0-0.08 parts by weight, preferably 0.04-0.06 parts by weight;

the cross-linking agent in an amount of 0.5-1.2 parts by weight, preferably 0.5-1 parts by weight;

water in an amount of 100 parts by weight.

Further, the method of preparing the cross-linked fracturing fluid comprises the following steps:

1) mixing a thickening agent, a cleanup additive, a clay stabilizer, a gel breaker and water to obtain a fracturing fluid base solution;
2) blending the fracturing fluid base solution with a crosslinking agent to obtain a cross-linked fracturing fluid.

The clay stabilizer and the gel breaker commonly used in the art may be adopted in the present disclosure. Preferably, the gel breaker is at least one selected from the group consisting of ammonium persulfate, potassium persulfate, and sodium sulfite.

In the present disclosure, the above-mentioned cleanup additive may be prepared with a conventional method in the art, in order to further improve the comprehensive performance of the cleanup additive, it is preferable that the raw materials for the preparation of the cleanup additive comprise a betaine zwitterionic surfactant, a polyoxypropylene polyoxyethylene propylene glycol ether, a polyoxyethylene lauryl ether and water.

Further, the process of preparing the cleanup additive comprises the following ingredients in parts by weight:

betaine zwitterionic surfactants, 2-20 parts by weight;

polyoxypropylene polyoxyethylene propylene glycol ether, 2-30 parts by weight;

polyoxyethylene lauryl ether, 0.05-0.5 parts by weight;

water, 49-78 parts by weight.

Further, the betaine zwitterionic surfactant is lauramidopropyl betaine.

Further, the method of preparing the cleanup additive comprises the following steps:

mixing the betaine zwitterionic surfactant, polyoxypropylene polyoxyethylene propylene glycol ether and water and dissolving, then blending with polyoxyethylene lauryl ether to prepare a cleanup additives.

Furthermore, after adding the thickening agent and the cleanup additive to water at the first stirring rate in step 1), stirring the materials at the second stirring rate to obtain a fracturing fluid base solution.

Furthermore, in step 2), adding a crosslinking agent into the fracturing fluid base solution and stirring at a third stirring speed to obtain a cross-linked fracturing fluid.

Still further, the first stirring speed, the second stirring speed and the third stirring speed are each independently selected from a range of 300-1,000 r/min. In various embodiments of the present disclosure, the numerical values of the first stirring speed, the second stirring speed and the third stirring speed are not limited, as long as the mixed liquids can be swirled to achieve the purpose of thorough mixing.

Still further, the stirring time at the second stirring speed is 1-3 min.

Still further, the stirring time at the third stirring speed is 3-10 min.

In some embodiments, the raw materials for preparing the crosslinking agent comprise organo-zirconium, organo-copper, polyol, organo-carboxylate, multi-element organic amine, anionic surfactant and water.

Further, the raw materials for preparing the crosslinking agent comprise the following ingredients in parts by weight:

organo-zirconium, 2-30 parts by weight, preferably 5-20 parts by weight;

organo-copper, 1-8 parts by weight, preferably 2-5 parts by weight;

polyol, 10-45 parts by weight, preferably 15-30 parts by weight;

organo-carboxylate, 10-45 parts by weight, preferably 15-30 parts by weight;

multi-element organic amine, 0.3-7 parts by weight, preferably 1-4 parts by weight;

anionic surfactant, 0.5-22 parts by weight, preferably 3-15 parts by weight;

water, 20-60 parts by weight, preferably 30-50 parts by weight.

Still further, a molar ratio of the organo-zirconium to the organo-copper is 5:(1-5).

Still further, the organo-zirconium is at least one selected from the group consisting of zirconium acetate, zirconium propionate, zirconium lactate and zirconium acetylacetonate.

Still further, the organo-copper is at least one selected from the group consisting of copper lactate, copper acetate, copper acetylacetonate and copper propionate.

Still further, the polyol is at least one selected from the group consisting of 1,2-propanediol, glycerol, ethylene glycol, xylitol, sorbitol and pentaerythritol.

Still further, the organo-carboxylate is at least one selected from the group consisting of sodium lactate, sodium citrate, sodium tartrate, sodium gluconate, sodium malate and sodium oxalate.

Still further, the multi-element organic amine is at least one selected from the group consisting of ethylene diamine, propylene diamine, polyethylene imine, di-ethylene triamine and tri-ethylene tetramine.

Still further, the anionic surfactant is at least one selected from the group consisting of sodium dodecyl benzenesulfonate, sodium dodecyl sulfate, sodium dodecyl sulfonate, sodium dodecyl polyoxyethylene ether sulfate, and ammonium dodecyl sulfate.

In the crosslinking agent of the present disclosure, besides the conventional polyol and organic ligand added to ensure solubility and high temperature resistance of the crosslinking agent, the organo-copper and organo-carboxylate type ligands are introduced to increase stability of the crosslinking complex and improve the temperature resistance. In addition, the introduction of an anionic surfactant provides dual physicochemical crosslinking effects to the crosslinking agent to broaden pH applicability of the crosslinking agent and shear resistance of the cross-linked jelly.

In some embodiments, the method of preparing the crosslinking agent comprises the following steps:

A1. mixing organo-zirconium, organo-copper and water to obtain an aqueous organo-copper and organo-zirconium solution;

A2. blending a polyol, an organo-carboxylate and the aqueous organo-copper and organo-zirconium solution to carrying out reaction to obtain a first reaction solution;

A3. blending the anionic surfactant with the first reaction solution and performing reaction to obtain a second reaction solution;

A4. mixing multi-element organic amine with the second reaction solution and carrying out reaction to prepare the cross-linking agent.

Further in step A1, the temperature of mixing the organo-zirconium, the organo-copper and water is within a range of 20° C.-30° C.

Further in step A2, the reaction conditions comprise a reaction temperature of 40° C.-60° C. and a reaction time of 3-6 h.

Further, after step A2 and before step A3, the temperature of the first reaction solution is adjusted to be 20° C.-30° C.

Further, after step A3 and before step A4, the temperature of the second reaction solution is adjusted to be 20° C.-30° C.

In the present disclosure, the method of preparing the crosslinking agent is simple, and the used amount is small, it can be used for both the high-temperature fracturing fluid and the acid solution crosslinking, and has desirable prospects for promotion and application.

The crosslinking agent of the present disclosure has excellent stability and crosslinking properties. It can crosslink to form a high temperature fracturing fluid system with resistance to the temperature 220° C. without requiring to adjust the pH under the neutral conditions, a delayed crosslinking time may be up to 250 seconds, and exhibits a desirable hanging performance, the fracturing fluid has desirable temperature resistance and shear resistance, and a tail viscosity may reach 250 mPa·s.

In the present disclosure, a glass rod is picked up under normal pressure and temperature conditions, if the hanging is possible and is not prone to break, it means a desirable hanging performance; if the hanging is prone to break, it means an instable hanging; if the hanging is not successful, it means an impossible hanging. The better is the hanging performance, the better is the crosslinking performance.

In the present disclosure, the temperature resistance, shear resistance and the delayed cross-linking time of the cross-linked fracturing fluid are tested according to the oil and natural gas industrial standard SY/T 5107-2016 "The evaluation measurement for properties of water-based fracturing fluid".

Tail viscosity means the viscosity of the system measured with the high temperature resistant rheometer after 1 h of shearing at the designated temperature and shearing rate.

The thickening agent and crosslinking agent provided by the present disclosure can be used for directly preparing various types of fracturing fluids having on-site blending and instant solubility, a resistance to high temperature of 180° C.-200° C., and cross-linkability under the broad range of pH. In addition, as compared with the thickening agent used alone, the system has improved hanging performance when used in combination with the crosslinking agent, both the temperature resistance and the shear resistance are significantly improved, it can meet the requirements of different fracturing operations, reduce the used amount of field equipment, and widen the applicable range of thickening agents for fracturing fluids.

The present disclosure provides a gelled acid comprising the aforementioned thickening agent.

In some embodiments, the raw materials for preparing the gelled acid comprise hydrochloric acid, the thickening agent, a ferric ion stabilizer, a corrosion inhibitor, a cleanup additive, and a gel breaker;

Further, the raw materials for preparing the gelled acid comprise the following ingredients in parts by weight:

the thickening agent, 0.5-1.2 parts by weight, preferably 1.0-1.2 parts by weight;

cleanup additive, 0.4-1.5 parts by weight, preferably 0.6-1.2 parts by weight;

corrosion inhibitor, 1-3.5 parts by weight, preferably 2.0-3.5 parts by weight;

gel breaker, 0.02-0.08 parts by weight, preferably 0.04-0.06 parts by weight;

a ferric ion stabilizer, 0.6-1.5 parts by weight, preferably 1.0-1.5 parts by weight;

hydrochloric acid, 10-30 parts by weight, preferably 14-20 parts by weight;

water, the balance, the sum of the parts by weight of water and the parts by weight of the remaining raw materials of the preparation is 100 parts by weight.

In the embodiment, the thickening agent, the cleanup additive, and the gel breaker have been described above, the content will not be repeated.

Still further, the corrosion inhibitor is at least one selected from the group consisting of imidazolines, quinoline quats, ketoaldamine condensates, and Mannich bases; more preferably, the corrosion inhibitor is at least one selected from the group consisting of 1-aminoethyl-2-pentadecyl imidazoline quaternary ammonium salt, 2-methylquinoline benzyl quaternary ammonium salt, and formaldehyde/p-phenylenediamine/acetophenone condensates.

Still further, the ferric ion stabilizer is an organic acid, more preferably at least one from the group consisting of citric acid, lactic acid, acetic acid, ethylenediamine tetraacetic acid (EDTA) and ascorbic acid.

Still further, the hydrochloric acid is derived from a hydrochloric acid solution with a weight concentration of 15-30 wt %; more preferably, the hydrochloric acid is derived from a hydrochloric acid solution with a weight concentration of 18-20 wt %.

In some embodiments, the method of preparing gelled acid comprises the following steps:

1) mixing the thickening agent, hydrochloric acid and water to obtain a first acid solution.

2) blending the first acid solution with the ferric ion stabilizer, a corrosion inhibitor, a gel breaker and a cleanup additive to obtain a gelled acid.

In some preferred embodiments, step 1) comprises adding the thickening agent to the hydrochloric acid solution at a first stirring speed, and stirring at a second stirring speed to obtain the first acid solution.

In some preferred embodiments, step 2) comprises adding a ferric ion stabilizer, a corrosion inhibitor, a gel breaker and a cleanup additive to the first acid solution sequentially, and stirring at the second stirring speed to obtain a gelled acid.

In various embodiments of the present disclosure, the first stirring speed and the second stirring speed are not limited, as long as the mixed liquids can be swirled to achieve the purpose of thorough mixing. Preferably, the first stirring speed and the second stirring speed are each independently selected from a range of 300-1,000 r/min.

Further, the time of stirring at the second stirring speed is 1-3 minutes.

The present disclosure provides a crosslinking acid comprising the aforementioned thickening agent.

In some embodiments, the raw materials for preparing the crosslinking acid comprises hydrochloric acid, the thickening agent, a ferric ion stabilizer, a corrosion inhibitor, a gel breaker, a cleanup additive, and a crosslinking agent;

Further, the raw materials for preparing the cross-linked acid comprise the following ingredients in parts by weight:

the thickening agent, 0.5-1.2 parts by weight, preferably 1.0-1.2 parts by weight;

a crosslinking agent, 0.3-2 parts by weight, preferably 0.5-1.5 parts by weight;

a cleanup additive, 0.4-1.5 parts by weight, preferably 0.6-1.2 parts by weight;

a corrosion inhibitor, 1-3.5 parts by weight, preferably 2.0-3.5 parts by weight;

a gel breaker, 0.02-0.08 parts by weight, preferably 0.04-0.06 parts by weight;

a ferric ion stabilizer, 0.6-1.5 parts by weight, preferably 1.0-1.5 parts by weight;

hydrochloric acid, 10-30 parts by weight, preferably 14-20 parts by weight;

water, the balance, the sum of the parts by weight of water and the parts by weight of the remaining raw materials of the preparation is 100 parts by weight.

In the embodiment, the thickening agent, hydrochloric acid, the ferric ion stabilizer, the corrosion inhibitor, the gel breaker, the cross-linking agent and the cleanup additive have been described above, the content will not be repeated herein.

In some embodiments, the method of preparing the crosslinking acid comprises the following steps:

1) mixing the thickening agent, hydrochloric acid and water to obtain a first acid solution.
2) blending the first acid solution with a ferric ion stabilizer, a corrosion inhibitor, a gel breaker and a cleanup additive to obtain a crosslinking acid based solution;
3) mixing the crosslinking acid based fluid with a crosslinking agent to obtain a crosslinking acid.

In some preferred embodiments, step 1) comprises adding a thickening agent to the hydrochloric acid solution at a first stirring speed, and stirring at a second stirring speed to obtain a first acid solution.

In some preferred embodiments, step 2) comprises adding a ferric ion stabilizer, a corrosion inhibitor, a gel breaker and a cleanup additive to the first acid solution sequentially, and stirring at a second stirring speed to obtain a cross-linked acid base solution.

In some preferred embodiments, step 3) comprises adding a crosslinking agent to the crosslinking acid base solution and stirring at a third stirring speed to prepare a crosslinking acid.

In various embodiments of the present disclosure, the first stirring speed, the second stirring speed and the third stirring speed are not limited, as long as the mixed liquids can be swirled to achieve the purpose of thorough mixing. Preferably, the first stirring speed, the second stirring speed and the third stirring speed are each independently selected from a range of 300-1,000 r/min.

Further, the time of stirring at the second stirring speed is 1-3 min.

Further, the stirring time at the third stirring speed is 3-10 min.

The crosslinking agent of the present disclosure has good stability and crosslinking properties, it can be cross-linked to form a crosslinked acid system with resistance to the temperature 200° C. by using the hydrochloric acid solution with a mass concentration of 15%-20%, the delayed crosslinking time may reach 250 seconds, and exhibits a desirable hanging performance, and the tail viscosity of the crosslinking acid solution reaches 180 mPa·s.

In the present disclosure, both the tail viscosity of the crosslinking acid and the tail viscosity of the gelled acid are measured according to the oil and gas industry standard SY/T5107-2016 of China, after shearing at a temperature of 200° C. and 170 $s^{-1}$ for 1 h.

The thickening agent provided by the present disclosure is used in combination with crosslinking agent, it can satisfy the crosslinking of both the fracturing fluid and the acid solution, and increase the number of crosslinking sites through dual effects in physical and chemical fields, thereby increasing the temperature resistance, shear resistance, sand-carrying performance and retarding performance of the crosslinked jelly (acid). The formed cross-linked fracturing fluid jelly can provide the cross-linked fracturing fluid with desirable temperature resistance and shear resistance, and the crosslinked jelly acid can improve the temperature resistance and retarding performance of the acid solution, and can achieve integration of the fracturing fluid-acid solution, thereby solving the problem of poor compatibility between different liquids.

In the present disclosure, the crosslinking agent can satisfy crosslinking requirements of both the cross-linked fracturing fluid and the acid solution within the pH range of 3-10. Due to the dual crosslinking effects of the physical and chemical fields, the cross-linked jelly (acid) is provided with the improved shear resistance and high temperature self-healing capabilities, such that the cross-linked jelly (acid) has better temperature resistance. Integration of the fracturing fluid-acid solution crosslinking agent is achieved by the crosslinking agent in combination with the thickening agent of the present disclosure.

The slickwater, the glue solution, the cross-linked fracturing fluid, the gelled acid or the cross-linked acid may be used in the reformation of reservoir, preferably in the reformation of the oil and gas reservoir. Further, the reservoir conditions of the oil and gas reservoir may comprise a depth of 5,000-12,000 km, a temperature of 150° C.-250° C.

The present disclosure will be described in detail below with reference to the specific examples, but the protection scope of the present disclosure is not limited to the following description.

If the following examples and comparative examples do not indicate specific conditions, the examples and comparative examples are performed according to the conventional conditions or the conditions suggested by the manufacturers. If the manufactures of the reagents or instruments are not specifically indicated, both pertain to the conventional products that are commercially available.

The CAS # and molecular weights of the monomers involved herein were shown below in Table 1:

TABLE 1

| Serial No. | Name of monomers | CAS# | Molecular weight |
|---|---|---|---|
| 1 | Acrylamide (AM) | 79-06-1 | 71.08 |
| 2 | Acrylic Acid (AA) | 79-10-7 | 72.06 |
| 3 | Acrylic-2-acrylamido-2-methylpropane sulfonic Acid (AMPS) | 15214-89-8 | 207.24 |

TABLE 1-continued

| Serial No. | Name of monomers | CAS# | Molecular weight |
|---|---|---|---|
| 4 | Polyoxyethylene acrylate type polymerizable surfactant (MOEA) | 9051-31-4 | 336.38-424.48 |
| 5 | Vinyl Imidazole (VI) | 1072-63-5 | 94.12 |

Unless otherwise specified in the following examples, p-acryloyloxybenzaldehyde (FPA) monomer was prepared according to the following method: 0.5 mol of p-hydroxy-benzaldehyde were dissolved in 500 mL of dichloromethane in an ice bath, the dry nitrogen gas was added under the stirring condition, 0.55 mol of acryloyl chloride was added to the mixed solution via a constant pressure funnel, stirring was continued for 24 h, the mixture was subjected to a rotary evaporation, the molecular weight of the obtained product was measured to be 178 by a mass spectrometry, it indicated that the product was p-acryloyloxybenzaldehyde (FPA) monomer.

Example 1

1) Aqueous solution of the polymeric monomers was formulated, wherein acrylamide (AM) monomer, acrylic acid (AA) monomer, acrylic acid-2-acrylamido-2-methylpropane sulfonic Acid (AMPS) monomer, p-acryloxybenzaldehyde (FPA) monomer, polyoxyethylene acrylate type polymerizable surfactant (MOEA, m=7, with a molecular weight of 380.43) and vinylimidazole (VI) monomer were added into a beaker at a molar ratio of n:o:q:y:p:x=74:1:21:0.5:3:0.5, distilled water was added to dissolve the monomers, and methanol was further added to obtain a first solution; wherein the total amount of the six monomers was 25 wt %, and the methanol was 10 wt %, based on weight percent, relative to the total weight of the first solution;
2) The monomer solution was added with 1 wt % thiourea, 0.05 wt % potassium formate, 0.03 wt % diethylenetriamine pentaacetate pentasodium and 0.05 wt % N,N,N',N'-tetramethylethylenediamine, relative to the weight of said monomer solution, the mixed solution was stirred and the materials were dissolved uniformly, and placed in a water bath of 10° C. and cooled for 30 min, and lowered the temperature to 10° C.;
3) A certain amount of sodium carbonate was added into the solution obtained in step 2) to adjust pH of the solution to 10 and obtain a mother liquor, which was put in a water bath of 10° C. and continuously cooled for 30 min, and allowed the temperature to decrease to 10° C., the mother liquor was introduced into an adiabatic polymerization plant, and nitrogen gas was introduced for 20 min;
4) The mother liquor was added with an aqueous solution of sodium diisobutylimidazoline hydrochloride in an amount of 0.02 wt %, an aqueous solution of ammonium ferrous sulfate in an amount of 0.005 wt % and an aqueous solution of hydrogen peroxide in an amount of 0.01 wt % relative to the weight of mother liquor sequentially, the nitrogen gas was further introduced for 20 min until the reaction system became viscous, the introduction of nitrogen gas was then stopped;
5) The temperature change of the system was observed, when the temperature of the system was raised to 60° C., the heat preservation was performed for 4 h;
6) The gommures obtained from the polymerization was taken out and granulated, and dried at 60° C. till a moisture content reached 3 wt %, and pulverized and then passed through a 20 mesh sieve to obtain a dry powder of thickening agent;
7) A colloid mill was used for dispersing the thickening agent powder in the 5 # white oil containing 10% of Tween 80, a 30 wt % of dispersion liquid is formed, the dispersion liquid was milled until the particle size was less than 400 nm, a liquid thickening agent was prepared.

The dry powder of thickening agent obtained from step 6) was washed with acetone to remove the unreacted monomers, an infrared spectrogram was measured using an infrared spectrometer (Bruker, Germany) with a model TENSOR 27, the infrared spectrogram was shown in the FIGURE. As illustrated in the FIGURE, a pronounced peak at 3400 $cm^{-1}$ was regarded as the free radical —$NH_2$; two absorption peaks at 1600 $cm^{-1}$, were the stretching vibration peak with "C═O double bonds" and the bending vibration peak with "N—H bonds" respectively. The stretching vibration absorption peaks at 1400-1600 $cm^{-1}$ were not observed accurately due to the influence of the carbonyl group "C═O double bonds" in the other monomers. However, the indivisible broad peaks at 1200-1400 $cm^{-1}$ corresponding to "C═O double bonds" of —COOH in acrylic acid were still clear. The "mountain-like" absorption peaks formed between 2900-3600 $cm^{-1}$ were compounded by the alkyl group characteristic absorption peaks in the polymer main chain and —OH associated with —COOH in the acrylic monomer. The "mountain-like" absorption peaks formed between 400-800 $cm^{-1}$ were the stretching vibration absorption peaks of "C—H bonds" in the group-$CH_2$ of the polymer main chain. In addition, some bending vibrations from "C—O—C bonds" in the polyoxyethylene acrylate monomer were also compounded. Significant tri-peaks were present at 3000-3100 $cm^{-1}$, although the peak intensity was weak, the peaks are relatively pronounced, which was the stretching vibration absorption peaks of the "phenyl ring" in the FPA monomer. Therefore, a successful polymerization of FPA can be judged based on a group of peaks consisting of three consecutive peaks at 3000-3100 $cm^{-1}$. An absorption peak with moderate intensity was present at 900-1000 $cm^{-1}$, which was the stretching vibration absorption peaks of the S═O double bonds in the "sulfonic acid group" in the AMPS monomer. Thus, a successful polymerization of AMPS can be determined based on the vibration absorption peaks of "S═O double bonds" at 900-1000 $cm^{-1}$ Weak absorption peaks below 400 $cm^{-1}$ were shown, which were characteristic peaks from vinylimidazole. Successful polymerization of vinylimidazole can be judged. To sum up, a polymer composed of the six monomers can be judged from the infrared spectrogram shown in the FIGURE. The polymer was measured with a viscosity average molecular weight of 12,500,000.

Examples 2-4

The polymer was prepared according to the same method as in Example 1, except that the concentration of the six monomers, the co-solvent, the chain transfer agent, the complexing agent, the activator, the oxidizing agent, the reducing agent and the water-soluble azo-based initiator were respectively different, the details were shown in Table 2.

TABLE 2

| Items | | Example 1 | Example 2 | Example 3 | Example 4 |
|---|---|---|---|---|---|
| Concentration of six monomers/wt % | | 25 | 25 | 27 | 29 |
| Organic solvent | Name | N,N'-dimethylformamide | Methanol | Methanol | Methanol |
| | wt % | 10 | 10 | 10 | 10 |
| Co-solvent | Name | Urea | Thiourea | Thiourea | Thiourea |
| | wt % | 1 | 1 | 1 | 1 |
| Chain transfer agent | Name | Sodium formate | Potassium formate | Potassium formate | Potassium formate |
| | wt % | 0.05 | 0.05 | 0.05 | 0.05 |
| Complexing agent | Name | Ethylene diamine tetraacetic acid tetrasodium | Ethylene diamine tetraacetic acid tetrasodium | Diethylene triamine pentaacetate pentasodium | Diethylene triamine pentaacetate pentasodium |
| | wt % | 0.03 | 0.03 | 0.03 | 0.03 |
| Activator | Name | N,N,N',N'-tetramethylethylenediamine | N,N,N',N'-tetramethylethylenediamine | N,N,N',N'-tetramethylethylenediamine | N,N,N',N'-tetramethylethylenediamine |
| | wt % | 0.05 | 0.05 | 0.1 | 0.1 |
| Oxidizing agent | Name | Ammonium persulfate | Ammonium persulfate | Tert-butyl hydroperoxide | Hydrogen peroxide |
| | wt % | 0.01 | 0.01 | 0.01 | 0.01 |
| Reducing agent | Name | Sodium bisulfite | Sodium bisulfite | Ammonium ferrous sulfate | Ammonium ferrous sulfate |
| | wt % | 0.005 | 0.005 | 0.005 | 0.005 |
| Initiator | Name | Sodium azobisisobutyramidine hydrochloride | Sodium azobisisobutyramidine hydrochloride | (N,N'-diethyl) azobisisobutyramidine hydrochloride | Sodium azobisisobutyramidine hydrochloride |
| | wt % | 0.02 | 0.02 | 0.02 | 0.02 |

Examples 5-7

The polymer was prepared according to the same method as in Example 1, except that the molar ratios n:o:q:y:p:x of the six monomers added in step 1) were different, the details were illustrated in Table 3.

Examples 8-10

The polymer was prepared according to the same method as in Example 1, except that the m values of the polyoxyethylene acrylate type polymerizable surfactant (MOEA) added in step 1) were different, the details were illustrated in Table 3.

Examples 11-12

The polymer was prepared according to the same method as in Example 1, except that the molar ratios n:o:q:y:p:x of the six monomers added in step 1) were different, the details were illustrated in Table 3.

Example 13

The polymer was prepared according to the same method as in Example 1, except that the vinylimidazole monomer (VI) was not added in the aqueous solution of the polymeric monomers formulated in step 1), wherein the molar ratio of acrylamide (AM) monomer, acrylic acid (AA) monomer, acrylic acid-2-acrylamido-2-methylpropane sulfonic acid (AMPS) monomer, p-acryloxybenzaldehyde (FPA) monomer and polyoxyethylene acrylate type polymerizable surfactant (MOEA, m=7, with a molecular weight of 380.43) was n:o:q:y:p=74:1:21:0.5:3.

Example 14

The polymer was prepared according to the same method as in Example 1, except that the polyoxyethylene acrylate type polymerizable surfactant was not added in the aqueous solution of the polymeric monomers formulated in step 1), wherein the molar ratio of acrylamide (AM) monomer, acrylic (AA) acid monomer, acrylic acid-2-acrylamido-2-methylpropane sulfonic acid (AMPS) monomer, p-acryloxybenzaldehyde (FPA) monomer and vinylimidazole (VI) monomer was n:o:q:y:p=74:1:21:0.5:0.5.

Example 15

The polymer was prepared according to the same method as in Example 1, except that the polyoxyethylene acrylate type polymerizable surfactant (MOEA, m=7, with a molecular weight of 380.43) and the vinylimidazole (VI) were not added in the aqueous solution of the polymeric monomers formulated in step 1), wherein the molar ratio of acrylamide (AM) monomer, acrylic acid (AA) monomer, acrylic acid-2-acrylamido-2-methylpropane sulfonic acid (AMPS) monomer and p-acryloxybenzaldehyde (FPA) monomer was n:o:q:y=74:1:21:0.5.

Comparative Example 1

The polymer was prepared according to the same method as in Example 1, except that p-acryloyloxybenzaldehyde (FPA) monomer was not added in the aqueous solution of the polymeric monomers formulated in step 1), wherein the molar ratio of acrylamide (AM) monomer, acrylic acid (AA) monomer, acrylic acid-2-acrylamido-2-methylpropane sulfonic acid (AMPS) monomer, polyoxyethylene acrylate type polymerizable surfactant (MOEA, m=7, with a molecular weight of 380.43) and vinylimidazole (VI) monomer was n:o:q:p:x=74:1:21:3:0.5.

Comparative Example 2

The polymer was prepared according to the same method as in Example 1, except that the acrylic acid-2-acrylamido-2-methylpropane sulfonic acid (AMPS) monomer was not added in the aqueous solution of the polymeric monomers formulated in step 1), wherein the molar ratio of acrylamide (AM) monomer, acrylic acid (AA) monomer, p-acryloyloxy-benzaldehyde (FPA) monomer, polyoxyethylene acrylate type polymerizable surfactant (MOEA, m=7, with a molecular weight of 380.43) and vinylimidazole (VI) monomer was n:o:y:p:x=74:1:0.5:3:0.5.

Comparative Example 3

24.5 g of acrylamide, 17.5 g of acrylic acid, 24.5 g of vinyl pyrrolidone and 37.5 g of AMPS were formulated into a solution using 100 g of water at 25° C., the pH of said solution was adjusted to 7 using potassium hydroxide (KOH) solution, the temperature was controlled to not exceed 30° C., 1 g of a solution of potassium persulfate (KPS) initiator with a concentration of 1 wt % was added to obtain an aqueous monomer solution.

10 g of emulsifier OP-10 and 15 g of emulsifier Span 40 were added into 120 g of white oil, the emulsifiers were dissolved uniformly by stirring, the emulsification was then performed by dropwise adding the aqueous monomer solution under the stirring condition. After the end of said emulsification, nitrogen gas was introduced for 30 min to remove oxygen gas from the system, and 10 g of aqueous solution of sodium bisulfite with a concentration of 1 wt % was added to start the reaction, the temperature of the reaction system was controlled not to exceed 50° C. and the reaction was performed for 5 h to obtain a milky white product.

TABLE 3

| Serial No. | Molar ratio of monomers | Value of m |
|---|---|---|
| Example 1 | n:o:q:y:p:x = 74:1:21:0.5:3:0.5 | 7 |
| Example 2 | n:o:q:y:p:x = 74:1:21:0.5:3:0.5 | 7 |
| Example 3 | n:o:q:y:p:x = 74:1:21:0.5:3:0.5 | 7 |
| Example 4 | n:o:q:y:p:x = 74:1:21:0.5:3:0.5 | 7 |
| Example 5 | n:o:q:y:p:x = 65:9:20:1:4:1 | 7 |
| Example 6 | n:o:q:y:p:x = 70:6:21:0.5:3.5:1 | 7 |
| Example 7 | n:o:q.y:p:x = 67:8:20.5:1:3:0.5 | 7 |
| Example 8 | n:o:q:y:p:x = 74:1:21:0.5:3:0.5 | 6 |
| Example 9 | n:o:q:y:p:x = 74:1:21:0.5:3:0.5 | 8 |

TABLE 3-continued

| Serial No. | Molar ratio of monomers | Value of m |
|---|---|---|
| Example 10 | n:o:q:y:p:x = 74:1:21:0.5:3:0.5 | 10 |
| Example 11 | n:o:q.y:p:x = 60:15:10:8:5:2 | 7 |
| Example 12 | n:o:q:y:p:x = 50:16:7:18:5:4 | 7 |
| Example 13 | n:o:q:y:p = 74:1:21:0.5:3 | 7 |
| Example 14 | n:o:q:y:x = 74:1:21:0.5:0.5 | / |
| Example 15 | n:o:q:y = 74:1:21:0.5 | / |
| Comparative Example 1 | n:o:q:p:x = 74:1:21:3:0.5 | 7 |
| Comparative Example 2 | n:o:y:p:x = 74:1:0.5:3:0.5 | 7 |

The liquid thickening agent with a concentration of 30 wt % prepared in Examples 1-15 and Comparative Examples 1-2 were used to prepare the acid solution, slickwater, and cross-linked fracturing fluid, respectively.

Application Example 1

Acid solution: the liquid thickening agent with a concentration of 30 wt % was added rapidly to an aqueous solution of hydrochloric acid (with the HCl concentration of 36 wt %), which had been added with a corrosion inhibitor (SRAI-1, commercially available from the SINOPEC Research Institute of Petroleum Engineering) has been added, so that the polymer powder, the hydrochloric acid solution and the corrosion inhibitor were contained in an amount of 1 wt %, 20 wt % and 3 wt %, respectively. The dissolution time under the stirring conditions (with a stirring speed of 450-800 r/min) was recorded, the gelled acid was obtained, and the apparent viscosity of each gelled acid was measured using a ZNN-D6 six-speed rotational viscometer. The cross-linking agent used for the cross-linking acid (SRAC-2 organo-zirconium cross-linking agent, commercially available from the SINOPEC Research Institute of Petroleum Engineering) was subsequently added to form the cross-linking acid, the concentration of the finally produced thickening agent in the cross-linking acid was 1 wt %.

The temperature resistance and shear resistance of the gelled acid and crosslinking acid were measured according to the oil and gas industry standard SY/T5107-2016 of China, after shearing at 200° C., 170 $s^{-1}$ for 1 h. The test results of acid solutions were shown in Table 4.

TABLE 4

Test results of acid solutions

| Serial No. | Dissolution time/min | State of cross-linked acid | Tail viscosity of cross-linked acid/mPa · s | Tail viscosity of gelled acid/mPa · s | Viscosity of gelled acid after standing still for 10 days/mPa · s |
|---|---|---|---|---|---|
| Example 1 | <3 | Desirable hanging performance | 94 | 43 | 54 |
| Example 2 | <3 | Desirable hanging performance | 93 | 40 | 51 |
| Example 3 | <3 | Desirable hanging performance | 92 | 41 | 53 |
| Example 4 | <3 | Desirable hanging performance | 92 | 40 | 52 |
| Example 5 | <3 | Desirable hanging performance | 91 | 43 | 54 |
| Example 6 | <3 | Desirable hanging performance | 91 | 43 | 52 |
| Example 7 | <3 | Desirable hanging performance | 90 | 40 | 53 |

TABLE 4-continued

Test results of acid solutions

| Serial No. | Dissolution time/min | State of cross-linked acid | Tail viscosity of cross-linked acid/mPa · s | Tail viscosity of gelled acid/mPa · s | Viscosity of gelled acid after standing still for 10 days/mPa · s |
|---|---|---|---|---|---|
| Example 8 | <3 | Desirable hanging performance | 90 | 42 | 51 |
| Example 9 | <3 | Desirable hanging performance | 90 | 42 | 51 |
| Example 10 | <3 | Desirable hanging performance | 90 | 41 | 50 |
| Example 11 | <3 | Desirable hanging performance | 85 | 34 | 45 |
| Example 12 | <3 | Desirable hanging performance | 80 | 33 | 44 |
| Example 13 | <3 | Desirable hanging performance | 78 | 32 | 42 |
| Example 14 | <3 | Desirable hanging performance | 76 | 31 | 41 |
| Example 15 | <3 | Desirable hanging performance | 75 | 30 | 40 |
| Comparative Example 1 | >5 | Impossible hanging | 60 | 23 | 30 |
| Comparative Example 2 | >5 | Instable hanging | 55 | 18 | 28 |
| Comparative Example 3 | >5 | Instable hanging | 60 | 24 | 26 |

As illustrated in Table 4, the dissolution time of thickening agent synthesized in the present disclosure in acid was less than 3 min, the on-site formulation of acid solution can be performed. The tail viscosity of the cross-linking acid after shearing at 200° C., 170 $s^{-1}$ for 1 h reached 75 mPa·s or more, the viscosity of gelled acid after shearing at 200° C., 170 $s^{-1}$ for 1 h reached 30 mPa·s or more, and the viscosity of gelled acid after standing still for 10 days reached 40 mPa·s or more, the performance requirements of the acid solution system were satisfied.

2) Slickwater: the liquid thickening agent with a concentration of 30 wt % was added rapidly into clean water, and stirred uniformly to form a slickwater, the concentration of final polymer in the slickwater was 0.09 wt %. The dissolution time under the stirring conditions (with a stirring speed of 450-800 r/min) was recorded, the apparent viscosity of the slickwater was measured using a ZNN-D6 six-speed rotational viscometer; the drag-reduction ratio of the slickwater was measured using a frictional resistance meter, the test results of the slickwater were shown in Table 5.

The drag-reduction ratio of the slickwater was measured according to the energy industry standard NB/T14003.1-2015 of China, "shale gas fracturing fluid Part 1: Performance index and evaluating method for slick water". In this case, the slickwater produced a pressure differential across a pipeline having a certain length and diameter after flowing downward at a certain velocity, the drag-reduction ratio of the slickwater was calculated based on a ratio of the difference value of the pressure differential between the slickwater and clean water (it was tap water in laboratory) relative to the pressure differential of the clean water.

Apparent viscosity was measured according to the method stipulated in the national standard GB/T16783.1-2014 of China.

TABLE 5

Test results of slickwater

| Serial No. | Dissolution time/min | Apparent viscosity/mPa · s | Drag-reduction ratio/% |
|---|---|---|---|
| Example 1 | <1 | 19 | 75 |
| Example 2 | <1 | 18 | 75 |
| Example 3 | <1 | 18 | 73 |
| Example 4 | <1 | 17 | 74 |
| Example 5 | <1 | 15 | 72 |
| Example 6 | <1 | 16 | 73 |
| Example 7 | <1 | 16 | 74 |
| Example 8 | <1 | 15 | 72 |
| Example 9 | <1 | 16 | 75 |
| Example 10 | <1 | 15 | 73 |
| Example 11 | <1 | 13 | 67 |
| Example 12 | <1 | 10 | 61 |
| Example 13 | <1 | 12 | 66 |
| Example 14 | <1 | 11 | 63 |
| Example 15 | <1 | 10 | 64 |
| Comparative Example 1 | >3 | 5 | 48 |
| Comparative Example 2 | >3 | 6 | 50 |
| Comparative Example 3 | >5 | 4 | 40 |

As shown in Table 5, the dissolution time of the thickening agent synthesized in the present disclosure in clean water was less than 1 min, an apparent viscosity of the base fluid reached 10 mPa·s or more, the drag-reduction ratio reached 60% or more.

Cross-linked fracturing fluid: the liquid thickening agent with a concentration of 30 wt % was rapidly added into clean water and stirred uniformly to obtain a fracturing fluid base solution. The dissolution time was recorded under the stirring conditions (with a stirring speed of 450-800 r/min), the apparent viscosity of said fracturing fluid base solution was measured by using a ZNN-D6 six-speed rotational viscometer. The cross-linking agent used for the fracturing fluid (SRAC-3 organo-zirconium cross-linking agent, commercially available from the SINOPEC Research Institute of Petroleum Engineering) was subsequently added to form a cross-linked fracturing fluid, the concentration of the finally produced thickening agent in the fracturing fluid was 0.45 wt %. The test results of the cross-linked fracturing fluids were shown in Table 6.

The temperature resistance and shear resistance of the fracturing fluids were measured according to the oil and gas industry standard SY/T5107-2016 of China, after shearing at 200° C., 170 $s^{-1}$ for 1 h.

TABLE 6

Test results of fracturing fluids

| Serial No. | Dissolution time/min | Apparent viscosity of base solution/mPa · s | Cross-linking state | Tail viscosity of fracturing fluid/mPa · s |
|---|---|---|---|---|
| Example 1 | <1 | 59 | Desirable hanging performance | 200 |
| Example 2 | <1 | 56 | Desirable hanging performance | 178 |
| Example 3 | <1 | 58 | Desirable hanging performance | 180 |
| Example 4 | <1 | 57 | Desirable hanging performance | 177 |
| Example 5 | <1 | 59 | Desirable hanging performance | 180 |
| Example 6 | <1 | 56 | Desirable hanging performance | 176 |
| Example 7 | <1 | 56 | Desirable hanging performance | 175 |
| Example 8 | <1 | 57 | Desirable hanging performance | 175 |
| Example 9 | <1 | 59 | Desirable hanging performance | 179 |
| Example 10 | <1 | 59 | Desirable hanging performance | 190 |
| Example 11 | <1 | 55 | Desirable hanging performance | 165 |
| Example 12 | <1 | 50 | Desirable hanging performance | 158 |
| Example 13 | <1 | 48 | Desirable hanging performance | 150 |
| Example 14 | <1 | 49 | Desirable hanging performance | 160 |
| Example 15 | <1 | 45 | Desirable hanging performance | 155 |
| Comparative Example 1 | >3 | 33 | Impossible hanging | 70 |
| Comparative Example 2 | >3 | 35 | Instable hanging | 80 |
| Comparative Example 3 | >3 | 40 | Instable hanging | 65 |

As can be seen from Table 6, the dissolution time of the thickening agent synthesized in the present disclosure was less than 1 min, the apparent viscosity of the formed fracturing fluid base solution reached 45 mPa·s or more, the tail viscosity of the cross-linked fracturing fluid after shearing at a high temperature of 200° C. reached 150 mPa·s or more, thereby meeting the performance requirements of the high temperature fracturing fluid. The dissolution time of the liquid thickening agent was less than 1 min, it allowed the on-site blending and formulation of the acid solution, the remaining properties of the liquid thickening agent are comparable to those of the thickening agent powder.

As indicated by the comprehensive results of the Table 4, Table 5 and Table 6, the thickening agent of the present disclosure can meet the requirements of the gelled acid, crosslinking acid, slickwater and cross-linked fracturing fluid on the thickening agent, thereby achieving the objective of thickening agent integration and greatly reducing the operational complexity.

Application Example 2

The cross-linked fracturing fluids were prepared by using the thickening agents (dry powder) prepared in step 6) of Example 1 and Comparative Example 3 respectively according to the formulation indicated in Table 6 and the method as follows:

1) a thickening agent dry powder and an cleanup additive were added into 100 parts by weight of water and stirred at 500 r/min, the mixture was then stirred at 700 r/min for 2 min to obtain a fracturing fluid base solution;
2) the above-mentioned crosslinking agent was added into the fracturing fluid base solution, and stirred at 700 r/min for 3 min to obtain the cross-linked fracturing fluid.

The cleanup additive and the crosslinking agent were each prepared according to the following method:

A method of preparing a cleanup additive including the following steps: 30 parts by weight of polyoxypropylene polyoxyethylene propylene glycol ether (PPE-1500, commercially available from Nantong Archers Chemical Co., Ltd.) and 20 parts by weight of lauramidopropyl betaine zwitterionic surfactant were dissolved in 49.5 parts by weight of water, and stirred until the materials was completely dissolved, 0.5 parts by weight of polyoxyethylene lauryl ether (MOA-4, commercially available from Nantong Archers Chemical Co., Ltd.) were further added and stirred uniformly, a cleanup additive was obtained.

A method of preparing a crosslinking agent including the following steps: A1. 5 parts by weight of zirconium acetylacetonate and 2 parts by weight of copper acetylacetonate were added into 30 parts by weight of water, the materials were sufficiently stirred and dissolved at 20° C. to obtain an aqueous solution of organic copper zirconium;

A2. 25 parts by weight of 1,2-propanediol and 25 parts by weight of sodium oxalate were sequentially added into the aqueous solution of organic copper zirconium, and the reaction was performed at constant temperature of 50° C. for 4 h to obtain a first reaction solution;

A3. 10 parts by weight of sodium dodecyl alcohol polyoxyethylene ether sulfate (AES, commercially available from the Jinan Yingchu Chemical Technology Co., Ltd.) to the first reaction solution, the materials were blended and stirred uniformly to obtain a second reaction solution;

A4. 4 parts by weight of polyethyleneimine (CAS #9002-98-6, commercially available from the Hubei Dongcao Chemical Technology Co., Ltd.) was added into the second reaction solution, the materials were blended and stirred uniformly to prepare a cross-linking agent.

The delayed crosslinking time, the temperature resistance and shear resistance of the cross-linked fracturing liquid were evaluated according to the oil and gas industrial standard SY/T5107-2016 in China (shearing at 200° C., 170 $s^{-1}$ for 1 h), the results were shown in Table 7.

TABLE 7

Test results of cross-linked fracturing fluid and its properties

| Source of thickening agents | Thickening agent, parts by weight | Cross-linking agent, parts by weight | Cleanup additive, parts by weight | Hanging performance of fracturing acid solution | Viscosity of fracturing fluid (mPa · s) | Delayed crosslinking time (s) | Tail viscosity (mPa · s) |
|---|---|---|---|---|---|---|---|
| Example 1 | 0.55 | 0.8 | 0.9 | Desirable hanging performance | 650 | 220 | 230 |
| Example 1 | 0.8 | 0.8 | 0.9 | Desirable hanging performance | 700 | 150 | 170 |
| Example 1 | 1.0 | 0.8 | 0.9 | Desirable hanging performance | 800 | 120 | 170 |
| Example 1 | 1.2 | 0.8 | 0.9 | Desirable hanging performance | 1000 | 100 | 150 |
| Comparative Example 3 | 0.55 | 0.8 | 0.9 | Instable hanging | 310 | 150 | 40 |

As can be seen from Table 7, the cross-linked fracturing fluid provided by the present disclosure can achieve the on-site instant formulation, the viscosity after crosslinking of fracturing fluids can reach 650 mPa·s, the viscosity after shearing at high temperature of 200° C. may be 150 mPa·s or more, and the fracturing liquid has desirable delayed crosslinking performance, it is a fracturing liquid system which can achieve the on-site instant formulation and adjustable crosslinking time, thus the fracturing liquid has widespread application prospect for the composite acid fracturing of the high temperature reservoir.

As indicated by the results of Tables 4-7, the thickening agent provided by the present disclosure can be used in the acid solution, the slickwater and the cross-linked fracturing fluid, and can meet the requirements of gelled acid, cross-linking acid, slickwater, and cross-linked fracturing fluid on the thickening agent, thereby achieving the objective of satisfying various application scenarios by using a thickening agent.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A polymer comprising a structural unit of formula (1), a structural unit of formula (2), a structural unit of formula (3) and a structural unit of formula (4),

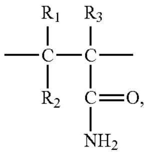

formula (1)

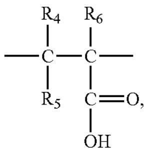

formula (2)

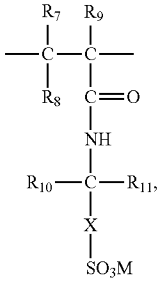

formula (3)

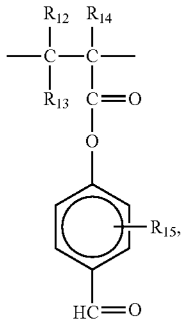

formula (4)

wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ are each independently hydrogen or a straight or branched C1-C10 alkyl group;

X is a straight or branched C1-C10 alkylene group; and

M is hydrogen or an alkali metal.

2. The polymer of claim 1, wherein a molar ratio of the structural unit of formula (1), the structural unit of formula (2), the structural unit of formula (3) and the structural unit of formula (4) is within a range of (65-74):(1-10):(19-21):(0.5-1).

3. The polymer of claim 1, wherein the polymer further comprises a structural unit of formula (5), formula (5)

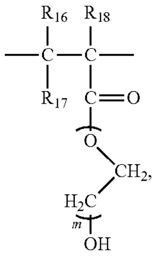

wherein $R_{16}$, $R_{17}$ and $R_{18}$ are each independently hydrogen or a straight or branched C1-C6 alkyl group; and m denotes the number of oxyethylene structure, and m=6-10.

4. The polymer of claim 3, wherein a molar ratio of the structural unit of formula (1) to the structural unit of formula (5) is within a range of (6-74):(2-4).

5. The polymer of claim 1, wherein the polymer further comprises a structural unit of formula (6), formula (6)

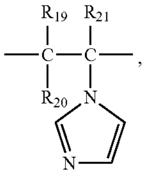

wherein $R_{19}$, $R_{20}$ and $R_{21}$ are each independently hydrogen or a straight or branched C1-C6 alkyl group.

6. The polymer of claim 5, wherein a molar ratio of the structural unit of formula (1) to the structural unit of formula (6) is within a range of (65-74):(0.5-1).

7. The polymer of claim 1, wherein the polymer has a viscosity average molecular weight of 12,000,000-14,000,000.

8. A thickening agent comprising the polymer of claim 1.

9. The thickening agent of claim 8, wherein when the liquid thickening agent with a polymer concentration of 30 wt % is added into fresh water to form a slickwater having a polymer concentration of 0.09 wt %, the thickening agent has a dissolution time in the fresh water of less than 1 min, an apparent viscosity of the slickwater of larger than or equal to 10 mPa's, and a drag-reduction ratio of greater than or equal to 60%.

10. A method of preparing a thickening agent comprising: subjecting polymeric monomers in an organic solvent and a co-agent to a polymerization reaction in the presence of an initiator under the polymerization reaction conditions, wherein the polymeric monomers include a monomer of formula (I), a monomer of formula (II), a monomer of formula (III), and a monomer of formula (IV), formula (I)

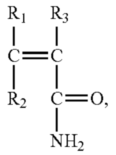

formula (II)

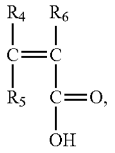

formula (III)

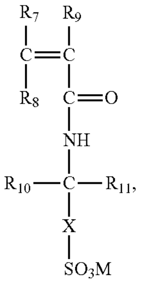

formula (IV)

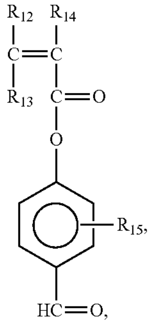

wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ are each independently hydrogen or a straight or branched C1-C10 alkyl group;

X is a straight or branched C1-C10 alkylene group; and

M is hydrogen or an alkali metal.

11. The method of claim 10, wherein a molar ratio of the monomer of formula (I), the monomer of formula (II), the monomer of formula (III) and the monomer of formula (IV) is within a range of (65-74):(1-10):(19-21):(0.5-1).

12. The method of claim 10, wherein the polymeric monomer further comprises a monomer of formula (V), formula (V)

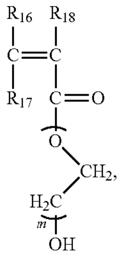

wherein $R_{16}$, $R_{17}$ and $R_{18}$ are each independently hydrogen or a straight or branched C1-C6 alkyl group; and m denotes the number of oxyethylene structure, and m=6-10.

13. The method of claim 12, wherein a molar ratio of the monomer of formula (I) to the structural unit of formula (V) is within a range of (65-74):(2-4).

14. The method of claim 10, wherein the polymeric monomer further comprises a monomer of formula (VI), formula (VI)

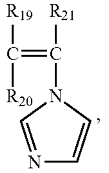

wherein $R_{19}$, $R_{20}$ and $R_{21}$ are each independently hydrogen or a straight or branched C1-C6 alkyl group.

15. The method of claim 14, wherein a molar ratio of the monomer of formula (I) to the structural unit of formula (VI) is within a range of (65-74):(0.5-1).

16. The method of claim 10, wherein a weight ratio of the polymeric monomers to the organic solvent is within a range of (25-29):(10-15).

17. The method of claim 10, wherein the co-agent is at least one selected from a chain transfer agent, a complexing agent, a co-solvent, an activator, a reducing agent, and an oxidizing agent.

18. The method of claim 10, wherein the method further comprises granulating, drying, pulverizing and sieving a polymerized colloid obtained from the polymerization reaction to prepare a dry powdered thickening agent.

19. The method of claim 18, wherein the method further comprises dispersing a powder of the dry powdered thickening agent in a mineral oil containing a mineral dispersant to obtain a liquid thickening agent.

20. The method of claim 10, wherein the polymerization reaction conditions comprise a temperature within the range of 50° C.-90° C., a time within the range of 3-6 h, and a pH within the range of 5-11.

* * * * *